(12) United States Patent
Tighe et al.

(10) Patent No.: US 7,718,298 B2
(45) Date of Patent: May 18, 2010

(54) BIFURCATION OF FLOW CHANNELS IN BIPOLAR PLATE FLOWFIELDS

(75) Inventors: Thomas W. Tighe, Bloomfield, NY (US); Jon P. Owejan, Honeoye, NY (US); Daniel J. Darga, Victor, NY (US); Pinkhas A. Rapaport, Fairport, NY (US); Jeffrey A. Rock, Fairport, NY (US); Thomas A. Trabold, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 613 days.

(21) Appl. No.: 11/684,705

(22) Filed: Mar. 12, 2007

(65) Prior Publication Data

US 2008/0226967 A1    Sep. 18, 2008

(51) Int. Cl.
*H01M 8/02* (2006.01)
(52) U.S. Cl. .............................. 429/34; 429/38; 429/39
(58) Field of Classification Search ............. 429/34–36, 429/38, 39
See application file for complete search history.

(56) References Cited

U.S. PATENT DOCUMENTS

| | | | | |
|---|---|---|---|---|
| 6,048,633 A | * | 4/2000 | Fujii et al. | 429/32 |
| 6,406,809 B1 | * | 6/2002 | Fujii et al. | 429/34 |
| 6,528,196 B1 | * | 3/2003 | Fujii et al. | 429/34 |
| 7,067,213 B2 | * | 6/2006 | Boff et al. | 429/34 |
| 7,112,385 B2 | | 9/2006 | Rock | |
| 2006/0093891 A1 | | 5/2006 | Issacci et al. | |

FOREIGN PATENT DOCUMENTS

| | | |
|---|---|---|
| CN | 1902772 A | 1/2007 |
| EP | 1 264 360 B1 | 6/2006 |
| JP | 61-256568 A | 11/1986 |
| WO | WO 03094269 A2 * | 11/2003 |

* cited by examiner

*Primary Examiner*—Gregg Cantelmo
(74) *Attorney, Agent, or Firm*—Fraser Clemens; Martin & Miller LLC; J. Douglas Miller

(57) ABSTRACT

A bipolar plate for a fuel cell is provided that includes a flowfield having an active surface with an inlet region and an outlet region. The active surface of the flowfield is in communication with the inlet region and the outlet region and has at least one flow channel formed therein. The at least one flow channel further has a cross-sectional area at the outlet region that is less than a cross-sectional area at the inlet region. In particular embodiments, the at least one flow channel is bifurcated. A fuel cell stack including a fuel cell and the bipolar plate is also provided.

14 Claims, 6 Drawing Sheets

BIFURCATION OF FLOW CHANNELS IN BIPOLAR PLATE FLOWFIELDS

FIELD OF THE INVENTION

The present disclosure relates to fuel cell systems and more particularly to a flowfield formed in a bipolar plate of a fuel cell stack.

BACKGROUND OF THE INVENTION

Fuel cells have been proposed as a clean, efficient and environmentally responsible power source for electric vehicles and various other applications. One example of a fuel cell is the Proton Exchange Membrane (PEM) fuel cell. The PEM fuel cell includes a membrane-electrode-assembly (MEA) that generally comprises a thin, solid polymer membrane-electrolyte having a catalyst and an electrode on both faces of the membrane-electrolyte.

The MEA generally comprises porous conductive materials, also known as gas diffusion media, which form the anode and cathode electrode layers. Fuel, such as hydrogen gas, is introduced at the anode where it reacts electrochemically in the presence of the catalyst to produce electrons and hydrogen cations. The electrons are conducted from the anode to the cathode through an electrical circuit disposed therebetween. Simultaneously, the hydrogen cations pass through the electrolyte to the cathode where an oxidant, such as oxygen or air, reacts electrochemically in the presence of the electrolyte and catalyst to produce oxygen anions. The oxygen anions react with the hydrogen cations to form water as a reaction product.

The MEA is typically interposed between a pair of electrically conductive contact elements or bipolar plates to complete a single PEM fuel cell. Bipolar plates serve as current collectors for the anode and cathode, and have appropriate flow channels and openings formed therein for distributing the fuel cell's gaseous reactants (i.e., the $H_2$ & $O_2$/air) over the surfaces of the respective electrodes. Bipolar plates can be assembled by bonding together two unipolar plates having the flow distribution fields formed thereon. Typically, bipolar plates also include inlet and outlet headers which, when aligned in a fuel cell stack, form internal supply and exhaust manifolds for directing the fuel cell's gaseous reactants and liquid coolant to and from, respectively, a plurality of anodes and cathodes.

As is well understood in the art, the membranes within a fuel cell need to have a certain relative humidity to maintain an ionic resistance across the membrane within a desired range to effectively conduct protons. During operation of the fuel cell, moisture from the MEAs and external humidification may enter the anode and cathode flow channels. Typically, the moisture is forced along the flow channels by the pressure of a gaseous reactant, with this pressure being a primary mechanism for water removal from the flow channels. However, if the pressure is not sufficient, water can accumulate in a phenomenon known as stagnation. Stagnant water can block flow channels and reduce the overall efficiency of the fuel cell. The accumulation of water can also lead to a higher rate of corrosion of the diffusion media and a poorer durability under freezing conditions. A high degree of water accumulation or stagnation can lead to fuel cell failure.

In view of the potential for water stagnation, pressure differentials between the supply manifolds and the exhaust manifolds and between adjacent flow channels or segments of the same flow channel are of considerable importance in designing a fuel cell. Along a flowfield from a reactant inlet to an outlet, partial pressures of the gaseous reactants are reduced as the reactants are consumed in a fuel cell reaction. On an anode flowfield, in particular, the pressure differential between the supply and exhaust manifolds is especially problematic due to consumption of hydrogen that occurs during fuel cell operation. Moreover, hydrogen used on the anode is less dense than $O_2$/air and the stoichiometry on the anode is lower than on the cathode, both of which further hinder water removal on the anode flowfield.

Minimizing water stagnation has been possible, for example, by purging the channels periodically with the reactant gas at a higher flow rate or by having generally higher reactant recirculation rates. However, on the cathode of the MEA, this increases the parasitic power applied to the air compressor and reduces overall system efficiency. Additionally, the use of hydrogen as a purge gas on the anode of the MEA is not desirable for the reasons described above. The use of hydrogen as a purge gas on the anode of the MEA can lead to reduced economy, poorer system efficiency, and increased system complexity.

A reduction in accumulated water in channels can also be accomplished by lessening inlet humidification. However, it is desirable to provide at least some relative humidity in the anode and cathode reactants to hydrate the fuel cell membranes. Dry inlet gas has a desiccating effect on the membrane-electrolyte and can increase a fuel cell's ionic resistance. This method also negatively affects the long-term durability of the membrane-electrolyte.

There is a continuing need for a bipolar plate having a flowfield that militates against water stagnation in flow channels, particularly in anode flow channels. Desirably, the flowfield also achieves an optimized current density, reduces corrosion of diffusion media, and maximizes stability and freeze capability of the fuel cell during operation thereof.

SUMMARY OF THE INVENTION

In concordance with the instant disclosure, a bipolar plate having a flowfield that militates against water stagnation, thereby achieving an optimized current density, reduced diffusion media corrosion, and maximized fuel cell stability and freeze capability is surprisingly discovered.

In one embodiment, a bipolar plate for a fuel cell includes a flowfield with an active surface having an inlet region and an outlet region. The active surface is in communication with the inlet region and the outlet region and has at least one flow channel formed therein. The at least one flow channel has a cross-sectional area at the outlet region that is lower than a cross-sectional area at the inlet region.

In a further embodiment, the bipolar plate for a fuel cell includes a plurality of flow channels being continuously bifurcated, wherein a quantity of flow channels in communication with the inlet region is greater than a quantity of flow channels in communication with the outlet region.

In an additional embodiment, the bipolar plate for a fuel cell has a plurality of flow channels alternately bifurcating and converging along a length of the active surface.

A fuel cell stack is further provided having at least one fuel cell with a membrane electrode assembly being disposed between a pair of bipolar plates. Each bipolar plate has an inlet region and an outlet region, and further includes a flowfield that militates against a decrease in a flow velocity of the gaseous reactant from the inlet region to the outlet region.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
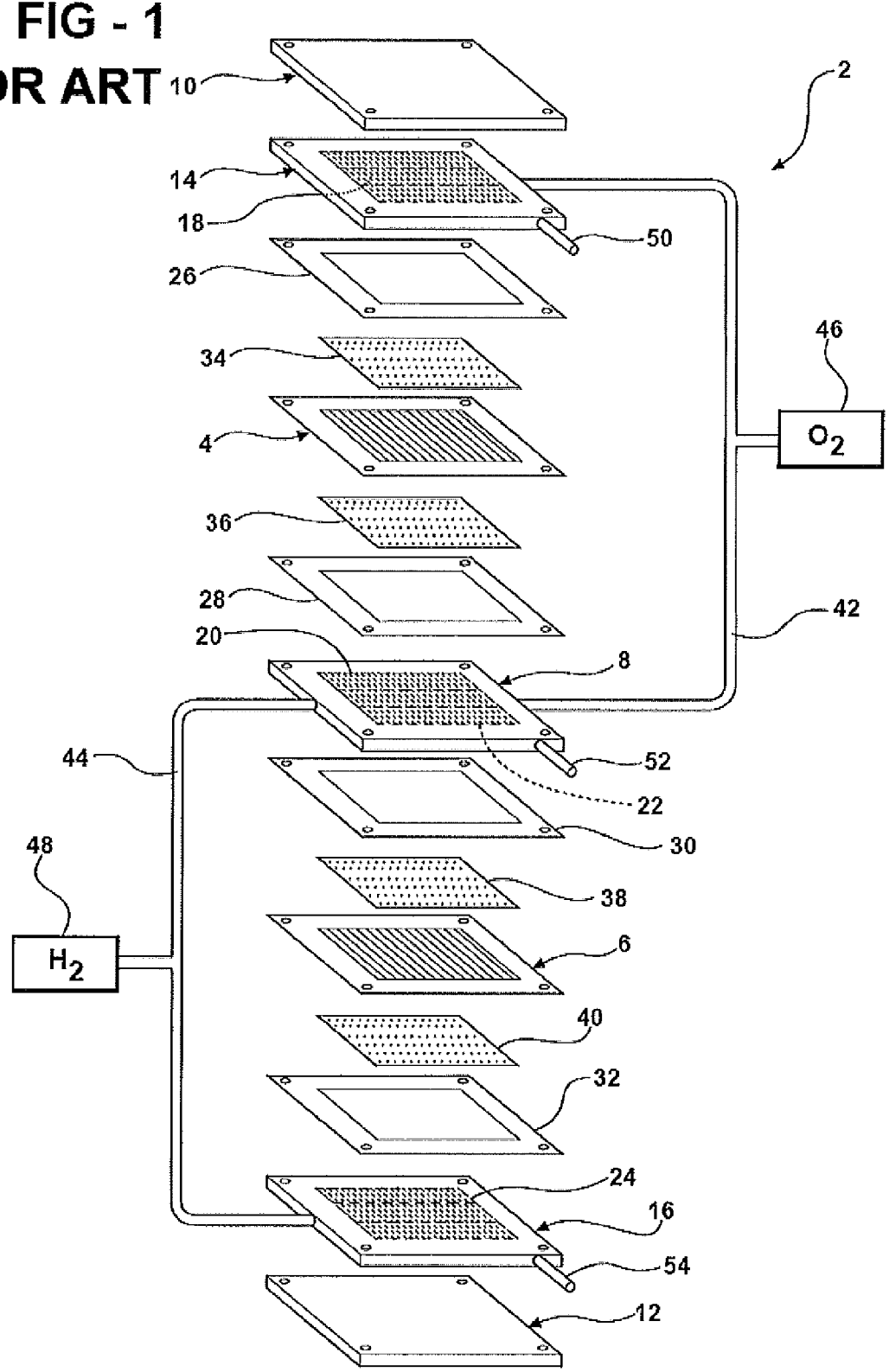
FIG. 1 illustrates a schematic, exploded perspective view of a PEM fuel cell stack (only two cells shown)

The following description is merely exemplary in nature and is not intended to limit the present disclosure, application, or uses. It should also be understood that throughout the drawings, corresponding reference numerals indicate like or corresponding parts and features.

For simplicity, only a two-cell stack (i.e. one bipolar plate) is illustrated and described hereafter, it being understood that a typical stack will have many more such cells and bipolar plates.

FIG. 1 depicts a two cell PEM fuel cell stack 2 having a pair of membrane-electrode-assemblies (MEAs) 4, 6 separated from each other by an electrically conductive fluid distribution element 8, hereinafter a bipolar plate 8. The MEAs 4, 6 and bipolar plate 8, are stacked together between end plates 10, 12, and end contact elements 14, 16. The end contact element 14, both active surfaces of the bipolar plate 8, and the end contact element 16 contain a plurality of flowpaths or flow channels 18, 20, 22, 24, respectively, for distributing a fuel such as $H_2$ and an oxidant gas such as $O_2$, for example, to the MEAs 4, 6. Nonconductive gaskets 26, 28, 30, 32 provide seals and electrical insulation between components of the fuel cell stack 2.

Electrodes 34, 36, 38, 40 of the MEAs 4, 6 are typically formed by a gas permeable conductive material such as a carbon/graphite diffusion paper or diffusion media, for example. The electrodes 34, 36, 38, 40 abut the electrode faces of the MEAs 4, 6. The end contact elements 14, 16 are forced against the electrodes 34, 40 respectively, while the bipolar plate 8 abuts the electrode 36 on an anode face of MEA 4, configured to accept a hydrogen-bearing reactant, and abuts electrode 38 on a cathode face of MEA 6, configured to accept an oxygen-bearing reactant. The oxygen-bearing reactant is supplied to a cathode side of the fuel cell stack 2 from a storage tank 46 by an appropriate supply conduit 42, while the hydrogen-bearing reactant is supplied to an anode side of the fuel cell stack 2 from storage tank 48, by an appropriate supply conduit 44. Alternatively, ambient air may be supplied to the cathode side as an oxygen-bearing reactant and hydrogen to the anode side from a methanol or gasoline reformer, or the like. An exhaust conduit (not shown) for both the anode and the cathode sides of the MEAs 4, 6 is also provided. Additional conduits 50, 52, 54 are provided for supplying a coolant to the bipolar plate 8 and the end plates 14, 16. Appropriate conduits (not shown) for exhausting coolant from the bipolar plate 8 and the end plates 14, 16 are also provided.

Figure 2:
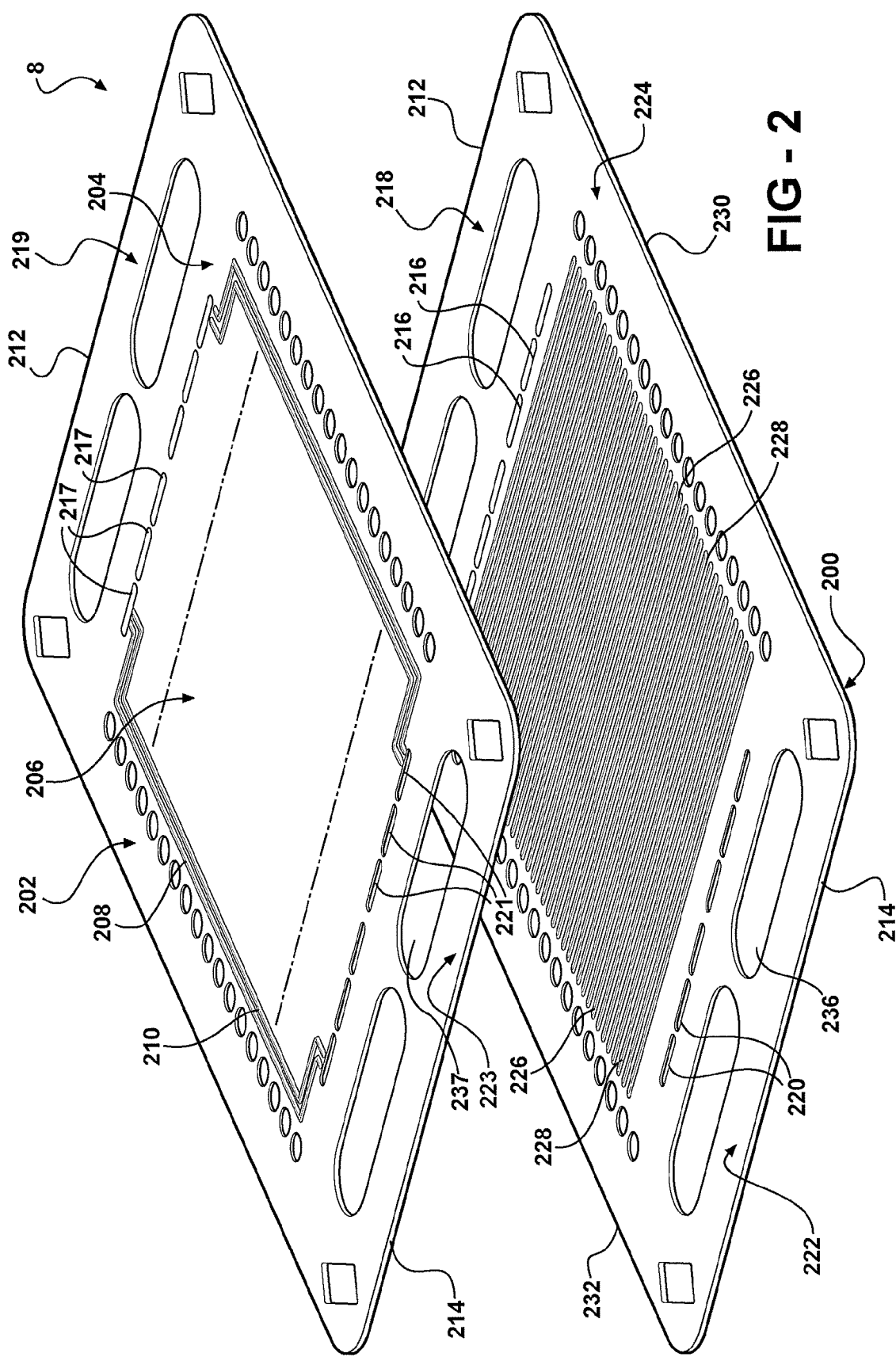
FIG. 2 is an exploded perspective view of an illustrative bipolar plate, assembled from a pair of unipolar plates, for use in PEM fuel cell stacks.

FIG. 2 is an exploded perspective view of an illustrative bipolar plate 8 in accordance with an embodiment of the present invention. The bipolar plate 8 comprises a first exterior metal sheet or unipolar plate 200 and a second exterior metal sheet or unipolar plate 202. The unipolar plates 200, 202 are typically formed by any conventional process for shaping sheet metal, such as, for example, stamping, machining, molding, or photo etching through a photolithographic mask. In one particular embodiment, the unipolar plates 200, 202 are formed by stamping.

It should be recognized that sheet metal is available in a variety of gauges which are suitable for the unipolar plates 200, 202 of the present invention. In particular embodiments, the metal sheets are from about 0.002 inches to about 0.02 inches thick. It is understood, however, that sheet metal of other thicknesses can be used as desired. It is further understood that other materials can be used. In other embodiments, the bipolar plate 8 may comprise a non-metal material, such as a graphite or graphite-filled polymer, for example.

An internal face 224 of the first unipolar plate 200 is shown in FIG. 2. A plurality of ridges 226 is formed in the internal face 224, defining therebetween a plurality of channels 228. The plurality of ridges 226 are configured for a coolant to flow from a first edge 230 of the bipolar plate to a second edge 232 An internal face (not shown) of the unipolar plate 202 also includes a plurality of ridges (not shown) which define therebetween a plurality of channels (not shown). The plurality of channels (not shown) are configured for a coolant to flow therethrough during the operation of the fuel cell stack 2.

The second unipolar plate 202 has an outer surface 204 which confronts a membrane electrode assembly (not shown), and is formed to provide a flowfield 206. The flowfield 206 is defined by a plurality of lands 208. The plurality of lands 208 define therebetween a plurality of flow channels 210 which constitute the "flowfield" through which the reactant gases flow. For example, the reactant gases can flow from a first end 212 of the bipolar plate to a second end 214 thereof. When the fuel cell is fully assembled, the lands 208 abut the porous carbon/graphite diffusion media 36, 38 which, in turn, abut the MEAs 4, 6.

Typically, the lands 208 and the flow channels 210 are formed in the outer surface of the unipolar plates 200, 202 that abuts the carbon/graphite diffusion media 36, 38. The flow channels 210 are configured to receive the reactant gas from supply ports 216, 217. The supply ports 216, 217 are formed in an inlet header 218, 219 and are disposed at the first end 212 of the bipolar plate 8. The flow channels 210 are further configured to exhaust the excess reactant gases and water via exit ports 220, 221. The exit ports 220, 221 are formed in an outlet header 222, 223 and are disposed at the second end 214 of the bipolar plate.

It should be understood that an external face of the unipolar plate 200 corresponds substantially to an external face of the unipolar plate 202. For example, like the unipolar plate 202, the external face of the unipolar plate 200 has an active surface (not shown). The unipolar plate 200 is formed to provide a flowfield (not shown) on the external face of the unipolar plate 200. As with the flowfield 206, the flowfield on the external face of the unipolar plate 200 is defined by a plurality of lands (not shown) formed thereon that further define a plurality of flow channels (not shown). The plurality of lands and the plurality of flow channels constitute the flowfield on the external face of the unipolar plate 200 through which the reactant gases pass. It should be understood that the design of the flowfield on the external face of the unipolar plate 200 can be substantially similar to the design of the flowfield 206.

The unipolar plates 200, 202 further have exhaust openings 236, 237 formed in the outlet headers 222, 223. The exhaust openings 236, 237 form an exhaust manifold in the aligned and assembled bipolar plate 8 which provides a passage for exhaust reactants and reaction products, for example liquid water and water vapor, to exit the fuel cell stack 2.

Typically, the unipolar plates 200, 202 are bonded together, for example by an adhesive, to form the assembled bipolar plate 8. Bonding may be accomplished, for example, by brazing, diffusion bonding, laser welding, or gluing with a conductive adhesive, as is well known in the art. Suitable binders are known to those of skill in the art and can be chosen as desired.

Figure 3:
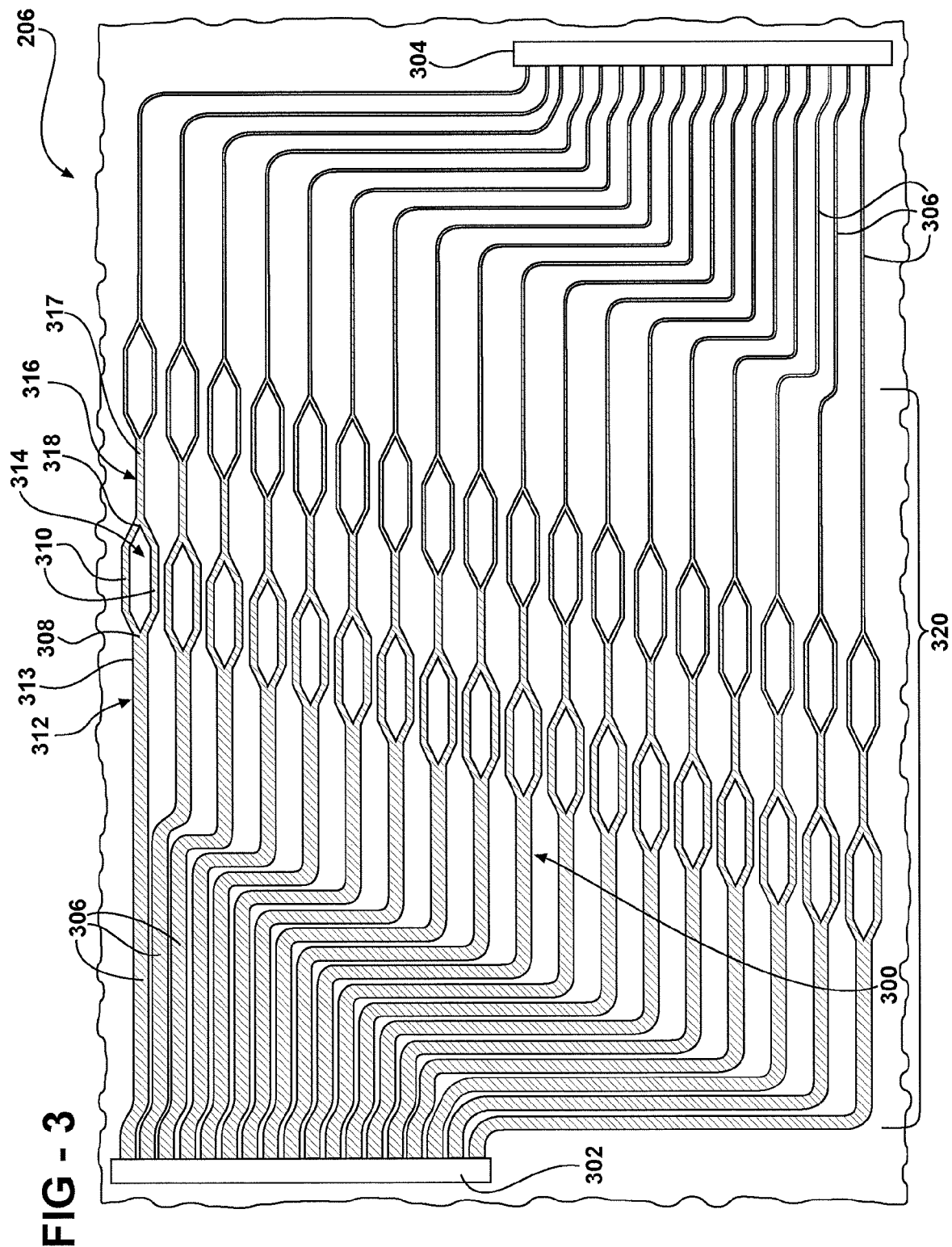
FIG. 3 is a top plan view of a bipolar plate flowfield having bifurcating and converging flow channels.

With reference to FIG. 3, the flowfield 206 includes an active surface 300 in communication with an inlet region 302, for example the supply ports 217. The active surface 300 is also in communication with an outlet region 304, for example the exit ports 221. The active surface 300 further includes at least one flow channel 306. The at least one flow channel 306 is formed in the active surface 300 and is depicted in FIGS. 3 to 6 with cross-hatching for purpose of clarity. The at least one flow channel 306 can have a cross-sectional area at the outlet region 304 that is lower than a cross-sectional area at the inlet region 302. It should be understood that a reduction in the cross-sectional area of the flow channel 306 can be continuous or can include discrete steps of reduced cross-sectional area.

In one embodiment, the at least one flow channel 306 has at least one bifurcation 308. The bifurcation 308 forms a subchannel 310. The subchannel 310 can have a cross-sectional area that is lower than the cross-sectional area of the flow channel 306. In particular embodiments, the at least one flow channel 306 can include a first region 312 having a flow channel portion 313 disposed before the bifurcation 308, a second region 314 having at least two subchannels 310, and a third region 316 having a flow channel portion 317 disposed after a convergence 318 of the at least two subchannels 310. As a nonlimiting example, the cross-sectional area of a subchannel 310 in the second region 314 can be lower than the cross-sectional area of the flow channel portion 313 in the first region 312. In one embodiment, the cross-sectional area of the subchannel 310 is about half the cross-sectional area of the flow channel portion 313. Illustratively, a cross-sectional area of the flow channel portion 317 disposed in the third region 316 can be lower than the cross-sectional area of the flow channel portion 313 in the first region 312.

In certain embodiments of the present disclosure, the cross-sectional area of the flow channel portion 317 is substantially equal to the cross-sectional area of the subchannel 310. Thus, the flow channel 313 can bifurcate into the two subchannels 310, each having about one-half the cross-sectional area of the flow channel 313. The two subchannels 310 can then converge to form the flow channel portion 317 and maintain the cross-sectional area of one of the subchannels 310. Accordingly, the at least one flow channel 306 can have the cross-sectional area at the outlet region 304 that is less than the cross-sectional area at the inlet region 302.

In a further embodiment, the flow channel 306 can alternately bifurcate and converge along a length 320 of the active surface 300. For example, the flow channel 306 can include a plurality of the bifurcations 308 and a plurality of the convergences 318. With more than one flow channel 306, it should be appreciated that the locations of the bifurcation 308 and the convergence 318 are not required to occur the same number of times or at the same location along the length 320 of each bifurcating flow channel 306 in the flowfield 206.

In operation, it should be appreciated that a reactant gas traveling through the flow channel 306 at a constant reactant flow increases in velocity as the cross-sectional area of the flow channel 306 decreases. As a non-limiting example, when the subchannel 310 in the second region 314 has about one-half the cross-sectional area of the flow channel 313 in the first region 312, the velocity of the reactant gas flowing therethrough can double (assuming a constant reactant flow). On the flowfield 206 abutting an anode, in particular, the flow channels 306 militate against a pressure differential that would otherwise typically form between the inlet region 302 and outlet region 304 due to a consumption of a hydrogen gas. In a particularly illustrative example, the velocity of the hydrogen gas from the inlet region 302 to the outlet region 304 can be substantially maintained. It should be understood that militating against the pressure differential can facilitate the removal of liquid water and water vapor from the flowfield 206 and thereby increase performance of the fuel cell stack 2. The removal of water in such a manner also inhibits corrosion of the diffusion media 34, 36, 38, 40 and improves the freeze durability of the stack 2.

Figure 4:
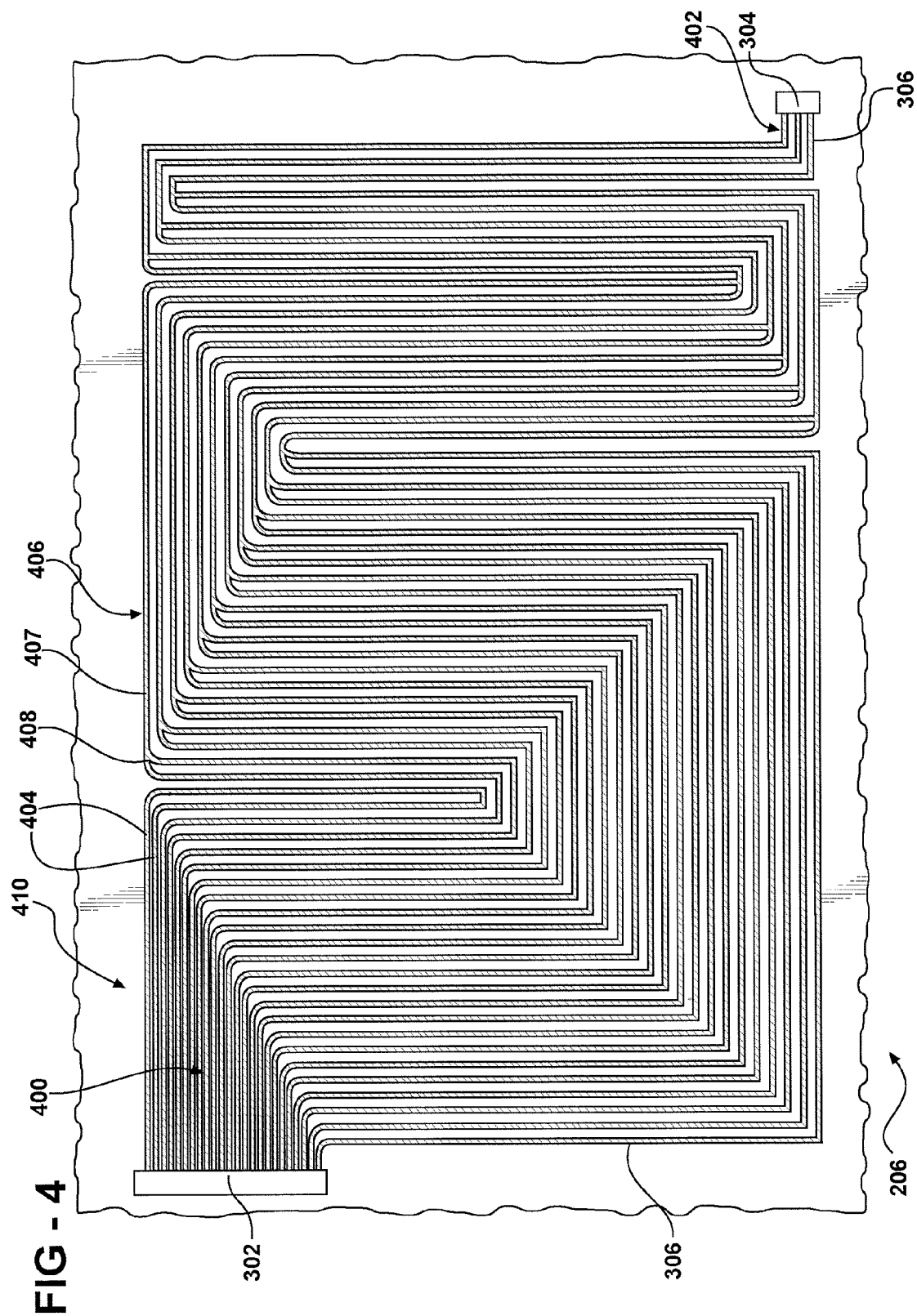
FIG. 4 is a top plan view of a bipolar plate flowfield having continuously bifurcating flow channels.

As depicted in FIG. 4, another embodiment of the present invention includes the at least one flow channel 306 being continuously bifurcated. As used herein, continuous bifurcation is defined to mean that the flow channel 306 is repeatedly bifurcated to provide at least two subchannels 404 which are subsequently also bifurcated. It should be understood that the bifurcation of the flow channel 306 in the described manner can be repeated as desired.

In one embodiment, the continuously bifurcated flow channel 306 can include a first quantity 400 of the flow channels 306 and a second quantity 402 of the flow channels 306. Illustratively, the first quantity 400 of the flow channels 306 can be in communication with the inlet region 302 of the flow field 206. The second quantity 403 of the flow channels 306 can be in communication with the outlet region 304 of the flow field 206. In particular embodiments, the first quantity 400 is greater than the second quantity 402. An amount of bifurcations of the flow channel 306 can be based on the size of the flowfield 206, for example. Similarly, a desired reduction in a quantity of the flow channels 306 from the inlet region 302 to the outlet region 304 can also be used to select the amount of bifurcations.

As a nonlimiting example, the flow channel 306 having continuous bifurcation can include a first region 406 with a flow channel portion 407 disposed before a bifurcation 408 and a second region 410 disposed after the bifurcation 408. The second region 410 can include two or more subchannels 404. In one embodiment, the subchannel 404 can have a cross-sectional area that is substantially equal to a cross-sectional area of the flow channel 407. In further embodiments, the cross-sectional area of the subchannel 404 can be lower than the cross-sectional area of the flow channel 407. In a particular embodiment, the cross-sectional area of the subchannel 404 is about one-half the cross-sectional area of the flow channel 306. As described above, the subchannel 404 can also be bifurcated.

It should be appreciated that, as depicted in FIG. 4, the continuous bifurcation of the at least one flow channel 306 can extend from the outlet region 304 to the inlet region 306. Thus, the first quantity 400 of the flow channels 306 in communication with the inlet region 302 can be greater than the second quantity 402 of the flow channels 306 in communication with the outlet region 304 of the flow field 206. As a nonlimiting example, the first quantity of channels 400 can be a factor of two or more greater than the second quantity of channels 402. In a particular embodiment, the first quantity of channels 400 is about a factor of three greater than the second quantity of channels 402.

In operation, one of skill in the art should recognize that a reactant gas traveling through the flow channel 306 can increase in velocity at a constant rate of reactant flow. Accordingly, where the cross-sectional area of the continuously bifurcating flow channel 306 does not vary substantially following the bifurcation, the reduced quantity of channels 402 at the outlet region 304 substantially maintains the velocity of the reactant gases as they are consumed in the fuel cell reactions. For example, on the flowfield 206 abutting an anode, the continuously bifurcated flow channels 306 militates against a pressure differential that would otherwise typically form between the inlet region 302 and outlet region 304. The pressure differential is primarily due to consumption of the hydrogen gas.

As with the flowfield 206 depicted in FIG. 3, the flowfield 206 depicted in FIG. 4 also facilitates the removal of water from the flow channels 306. The removal of water optimizes the performance of the fuel cell stack 2, inhibits corrosion of the diffusion media 34, 36, 38, 40 and maximizes the freeze durability of the stack 2.

Figure 5:
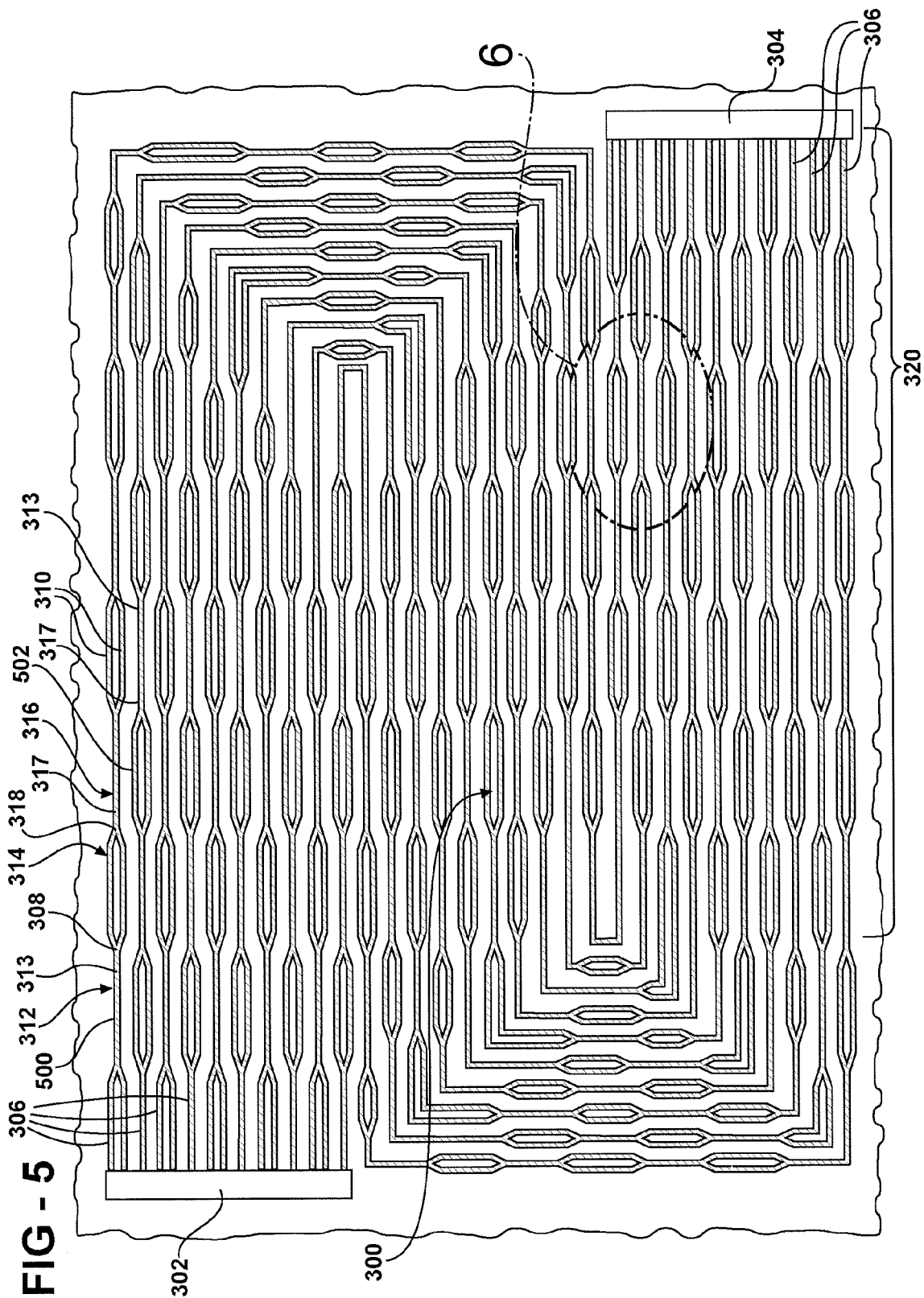
FIG. 5 is a top plan view of a bipolar plate flowfield having offset bifurcating and converging flow channels.

With reference to FIG. 5, a further embodiment of the invention includes the plurality of flow channels 306 having at least one first flow channel 500 and at least one second flow channel 502. The first and second flow channels 500, 502 can be offset from, and disposed adjacent to, each other on the active surface 300. Each of the first flow channel 500 and second flow channel 502 can include the first region 312 having the flow channel portion 313 disposed before the bifurcation 308, the second region 314 having at least two subchannels 310, and the third region 316 having the flow channel portion 317 disposed after the convergence 318. In particular embodiments, the first flow channel 500 and the second flow channel 502 are offset by two pitches so as to dispose the first region 312 or third region 316 of the first flow channel 500 adjacent to the second region 314 of the second flow channel 502. The offset first flow channel 500 and the second flow channel 502 define the lands 208 disposed therebetween.

In operation, it should be understood that a pressure of reactant gases in the subchannels 310 of the second region 314 can be higher than a pressure of reactant gases in the flow channel 306 of the first and third regions 312, 316. Thus, a pressure gradient can form between the offset and adjacent first and second flow channels 500, 502.

Figure 6:
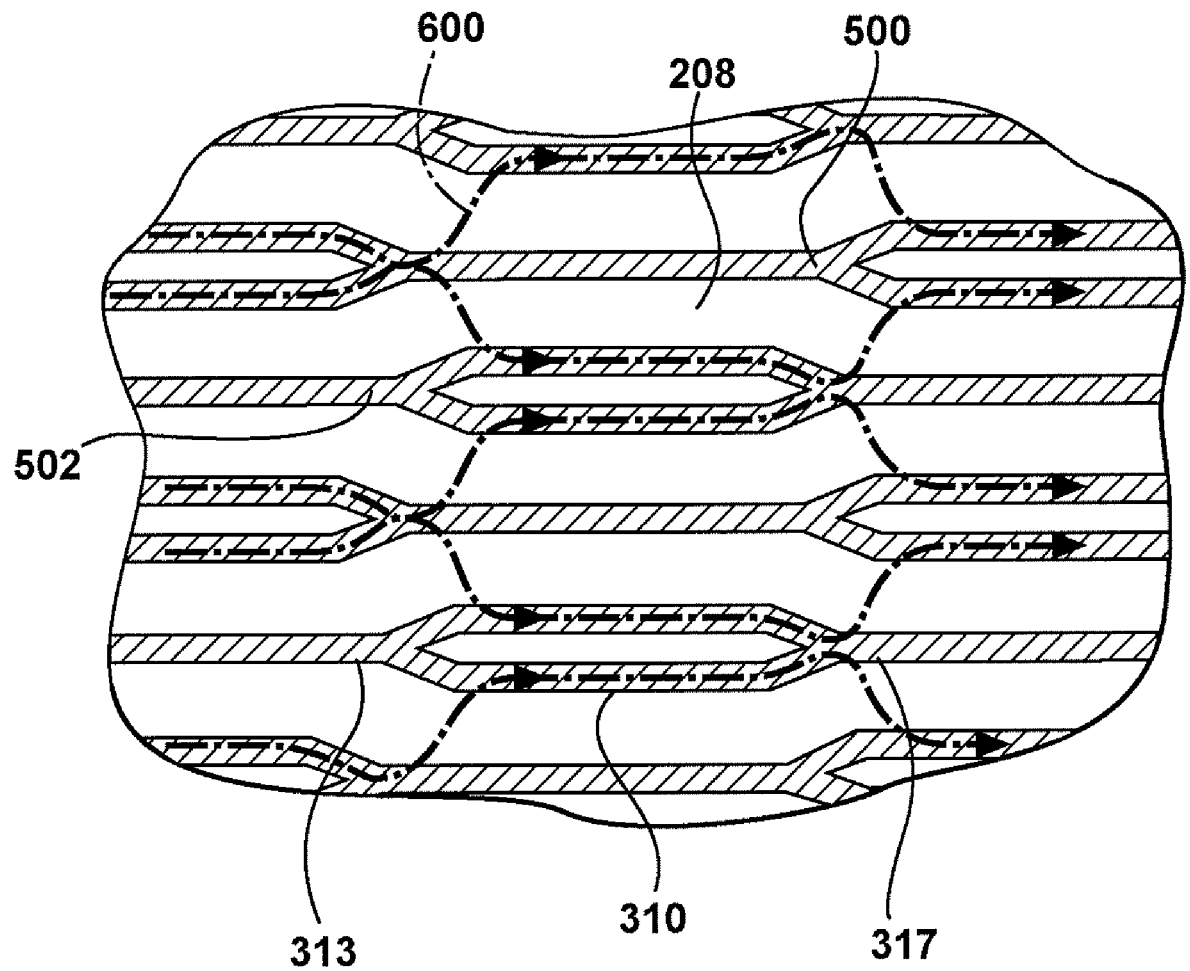
FIG. 6 is a fragmentary top plan view of a portion of the flowfield depicted in FIG. 5.

As depicted in FIG. 6, the pressure gradient promotes a convective flow 600 over the lands 208 which results in an over-land flow of reactant gases. The over-land flow of reactant gases acts to equalize the pressure gradient. This militates against a selective flowing of the reactant gases down one path instead of another. Thus, the bifurcating and converging flow channels 306 are effective in evenly distributing the gaseous reactants over active surface 300.

In addition to the bifurcated flow channels 206 described herein, it should be understood that the flowfield 206 can also include one or more U-bends (not shown) and/or a mixing areas (not shown) for further distribution of reactant gases. These and other configurations known in the art for facilitating a distribution of reactant gases can be used with the flowfield 206 of the present invention.

One of skill in the art can also select an optimum frequency for the bifurcations and convergences of the first and second flow channels 500, 502 along the length 320 of the active surface 206, in order to obtain a desired convective flow. Such an even distribution of the react gases optimizes the fuel cell performance. It should be further recognized that the convective flow militates against freezing in frigid conditions by inhibiting water stagnation.

The bipolar plates 8 of the present invention can be used in the fuel cell stack 2. Such fuel cell stacks 2 can be used in power systems for operating a vehicle, for example an automobile. In particular, when in operation as part of the fuel cell stack 2 the flowfield 206 can inhibit or militates against a decrease in a flow velocity of the gaseous reactant from the inlet region 302 to the outlet region 304. As an illustrative embodiment, the gaseous reactant can comprise a hydrogen gas and the flowfield 206 can abut an anode for distribution of the hydrogen gas. The maintenance of a minimum flow rate of the hydrogen gas militates against water stagnation in the anode flowfield 206. As described, the inhibition of water stagnation results in a reduced occurrence of corrosion of the diffusion media. Freeze capability of the fuel cell during operation under frigid conditions is also maximized with the present invention. The flowfield 206 further provides an optimized current density as a result of the even distribution of the gaseous reactants over the active surface 300.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bipolar plate for a fuel cell comprising:
a flowfield including an active surface with an inlet region and an outlet region, the active surface in communication with the inlet region and the outlet region and having a plurality of flow channels formed therein, the plurality of flow channels defining a plurality of lands, each of the lands being disposed between a pair of the flow channels,
wherein the plurality of flow channels includes a first flow channel and a second flow channel, the first flow channel disposed adjacent the second flow channel in the active surface of the flowfield,
wherein the first flow channel has a first region disposed before a bifurcation, a second region having at least two subchannels, and a third region disposed after a convergence of the at least two subchannels, the first region, the second region, and the third region together forming a repeating unit of the first flow channel, the first flow channel including a plurality of the repeating units along a linear length of the first flow channel between the inlet region and the outlet region, and
wherein the second flow channel has a first region disposed before a bifurcation, a second region having at least two subchannels, and a third region disposed after a convergence of the at least two subchannels, the first region, the second region and the third region together forming a repeating unit of the second flow channel, the second flow channel including a plurality of the repeating units along a linear length of the second flow channel between the inlet region and the outlet region.

2. The bipolar plate of claim 1, wherein a cross-sectional area of one of the subchannels in the second region is less than about one-half of a cross-sectional area of the flow channel in the first region.

3. The bipolar plate of claim 1, wherein a cross-sectional area of the flow channel in the third region is less than a cross-sectional area of the flow channel in the first region.

4. The bipolar plate of claim 3, wherein the cross-sectional area of the third region and the cross-sectional area of one of the subchannels in the second region are substantially equal.

5. The bipolar plate of claim 1, wherein one of the subchannels is bifurcated.

6. The bipolar plate of claim 1, wherein each of the flow channels has a cross-sectional area at the outlet region that is less than a cross-sectional area of each of the flow channels at the inlet region.

7. The bipolar plate of claim 1, wherein the first flow channel is offset from the second flow channel, and the second region of the first flow channel is disposed adjacent the first or third region of the second flow channel.

8. The bipolar plate of claim 1, wherein the first flow channel is offset from the second flow channel, and the second region of the first flow channel is disposed adjacent the second region of the second flow channel.

9. A bipolar plate for a fuel cell comprising:
a flowfield including an active surface with an inlet region and an outlet region, the active surface being in communication with the inlet region and the outlet region and having a plurality of flow channels formed therein, the plurality of flow channels defining a plurality of lands, each of the lands being disposed between a pair of the flow channels,
wherein the plurality of flow channels includes a first flow channel and a second flow channel, the first flow channel disposed adjacent the second flow channel in the active surface of the flowfield,
wherein the first flow channel has a first region disposed before a bifurcation, a second region having at least two subchannels, and a third region disposed after a convergence of the at least two subchannels, the first region, the second region, and the third region together forming a repeating unit of the first flow channel, the first flow channel including a plurality of the repeating units along a linear length of the first flow channel between the inlet region and the outlet region, and
wherein the second flow channel has a first region disposed before a bifurcation, a second region having at least two subchannels, and a third region disposed after a convergence of the at least two subchannels, the first region, the second region and the third region together forming a repeating unit of the second flow channel, the second flow channel including a plurality of the repeating units along a linear length of the second flow channel between the inlet region and the outlet region,
wherein the first flow channel is offset from the second flow channel, and the second region of the first flow channel is disposed adjacent the first or third region of the second flow channel.

10. The bipolar plate of claim 9, wherein a cross-sectional area of the flow channel in the first region and a cross-sectional area of a subchannel in the second region are substantially equal.

11. A fuel cell stack comprising:
at least one fuel cell having a membrane electrode assembly with an anode layer and a cathode layer, the membrane electrode assembly being disposed between a pair of bipolar plates, each bipolar plate having a flowfield with an inlet region where a gaseous reactant is supplied to the flowfield and an outlet region where the gaseous reactant exits the flowfield,
the flowfield having an active surface with a plurality of flow channels formed therein, the flow channels being in communication with the inlet region and the outlet region for distribution of the gaseous reactant to one of the anode layer and cathode layer, the plurality of flow channels defining a plurality of lands, each of the lands being disposed between a pair of the flow channels,
wherein the plurality of flow channels includes a first flow channel and a second flow channel, the first flow channel disposed adjacent the second flow channel in the active surface of the flowfield,
wherein the first flow channel has a first region disposed before a bifurcation, a second region having at least two subchannels, and a third region disposed after a convergence of the at least two subchannels, the first region, the second region, and the third region together forming a repeating unit of the first flow channel, the first flow channel including a plurality of the repeating units along a linear length of the first flow channel between the inlet region and the outlet region, and
wherein the second flow channel has a first region disposed before a bifurcation, a second region having at least two subchannels, and a third region disposed after a convergence of the at least two subchannels, the first region, the second region and the third region together forming a repeating unit of the second flow channel, the second flow channel including a plurality of the repeating units along a linear length of the second flow channel between the inlet region and the outlet region.

12. The fuel cell stack of claim 11, wherein the gaseous reactant comprises hydrogen.

13. The fuel cell stack of claim 11, wherein the flowfield creates a pressure gradient between the first flow channel and the second flow channel, thereby promoting a convective flow of the gaseous reactant over the lands.

14. The fuel cell stack of claim 11, wherein the flowfield militates against a decrease in a flow velocity of the gaseous reactant from the inlet region to the outlet region.

* * * * *